ANTICORROSIVE ELECTROPHORETIC COATING PROCESS

Filed Aug. 19, 1970

INVENTORS
HARRY F. BELL
DONALD J. LAZZARINI
LEWIS K. SCHULTZ

BY Sughrue, Rothwell, Mion, Zinn & Macpeak
ATTORNEYS

United States Patent Office 3,699,029
Patented Oct. 17, 1972

3,699,029
ANTICORROSIVE ELECTROPHORETIC COATING PROCESS

Harry F. Bell, 20 Sabra Lane, Wappingers Falls, N.Y. 12590; Donald J. Lazzarini, 909 Murray Hill Road, Binghamton, N.Y. 13903; and Lewis K. Schultz, 11 Brown Lane, Apalachin, N.Y. 13732

Filed Aug. 19, 1970, Ser. No. 65,045
Int. Cl. B01k *5/02;* C23b *13/00*
U.S. Cl. 204—181 9 Claims

ABSTRACT OF THE DISCLOSURE

Anticorrosive coatings are selectively, electrophoretically deposited on substrates, including electronic components.

The process comprises forming a polyvinylidene-chloride-epoxy ester resin polymer suspension in water, and selectively, electrophoretically depositing the polymeric components of the suspension onto the desired portions of the electronic components. Benzotriazole is a preferred additive to inhibit corrosion. By selection of the electrophoretic deposition voltage, metal portions of the component having a formal oxidation potential below the coating voltage will have the polymer blend deposited thereon, whereas metal portions having a formal oxidation potential above the coating voltage will remain uncoated.

BACKGROUND OF THE INVENTION

Field of the invention

The present invention relates to electrophoretic coating processes and electrophoretic coating bath compositions useful therein, and to products produced by the process.

Description of the prior art

Various anticorrosive protective coatings have been proposed for electronic components and contacts which are exposed to hostile environments such as chlorine and sulphur gases. However, the coatings of the prior art have led to machine failures resulting from corrosion products accumulating on areas of electronic systems, such as spring contacts, thereby leading to electrical shorts between contacts.

The prior art has proposed polymer coating processes to protect against corrosive environments. For instance, dip coated polymers have been used, but these coatings have failed at the sharp edges of electronic components, such as contacts, due to the fact that these coatings do not conform to the shape of the article coated. While an adequate coating may be provided on planar surfaces, the sharp edges of the component, often found at contact points, receive a very thin coating and rapidly become exposed to the hostile environment.

The prior art has also proposed the vapor deposition of polymeric coatings. However, it is very difficult to control the exact area of deposition using such a process without elaborate masking techniques. Accordingly, it was necessary to remove undesired coating, for instance by burning off undesired deposits with a laser beam.

The electrophoretic coating of polymers is known. However, such coatings are typically formed of only one polymer and yield a thick, often porous, coating unsuitable for usage in protecting microelectronic components from hostile environments.

SUMMARY OF THE INVENTION

The present invention solves the above problems of the prior art and provides a polymeric, anticorrosive coating for electronic components which conforms to the shape of the component, most especially an electrical contact, whereby a conformal, protective, anti-corrosive coating of polymer is provided at the sharp edges of the component. In a preferred embodiment, benzotriazole is incorporated into the polymeric coating.

The present invention further enables selected metals in the electronic component, i.e., those having a formal oxidation potential beneath the deposition voltage, to be coated, while other metals, i.e., those which have a formal oxidation potential above the deposition voltage, remain uncoated with the polymeric blend.

The process for selectively, electrophoretically coating an electronic component comprises, in a preferred embodiment, forming a suspension of fine particles of polyvinylidene chloride, epoxy ester polymer and benzotriazole in water, immersing the component in the suspension and electrophoretically coating the component using a carefully controlled deposition voltage. The coating fixture is also not coated, and therefore requires no cleaning.

A component comprising a metal having a formal oxidation potential lower than the voltage applied during electrophoretic deposition, and a metal having a formal oxidation potential higher than the applied voltage, can be selectively coated with polymer. This result can be achieved because a metal with a lower formal oxidation potential will yield an ion, thereby accepting a polymeric coating, whereas a metal having a higher formal oxidation potential will not yield an ion during electrophoretic coating, and, therefore, will not accept a polymeric coating. For instance, in coating a spring contact which is a laminate of nickel-beryllium copper alloy-nickel and which has a gold contact button, the beryllium copper alloy may be polymerically coated, and the gold contact button and nickel may be left uncoated, by selection of a particular coating voltage. This eliminates the need for subsequent cleaning of the contacts, formerly performed by brief exposure to a laser beam or other technique.

It is an object of the present invention to provide a novel corrosion-resistant polymeric coating blend for electrical components, said coating being electrophoretically deposited.

It is a further object of the present invention to provide a corrosion-resistant polymeric coating for electrical components having a conformal nature, and a novel, coated electrical component, that is, one wherein sharp edges and the like receive a conformal, corrosion-resistant coating of a thickness sufficient to protect the electrical comopnent.

It is yet another object of the present invention to provide a novel process for coating electrical components comprising the selective control of the applied coating voltage so that certain metals will receive a polymeric coating, whereas other metals will not be polymerically coated.

These and other objects of the present invention will be more fully appreciated by referenuce to the accompanying drawings considered in conjunction with the detailed description of the preferred embodiments of the present invention.

DETAILED DESCRIPTION OF THE PREFERRED EMBODIMENTS

The present invention, as heretofore indicated, has two main aspects. In a first aspect thereof, the present invention provides a novel process for electrophoretically depositing a corrosion-resistant, conformal polymer blend onto selected metallic portions of an electronic component. A preferred embodiment of the process aspect of this invention comprises electrophoretically depositing a conformal blend of polyvinylidene chloride and epoxy ester resin polymer onto selected metallic portions of an electronic component.

The second aspect of the present invention provides a novel conformal coating per se for electronic components, most preferably spring contacts, which provides superior corrosion-resistance to the spring contact.

The following discussion is offered primarily in the context of electronic contact clips, utilized in a printed circuit or the like. It will be appreciated that the application of the invention to such contact clips is merely illustrative of the present invention, and the invention is not limited thereto.

Reference should, at this point, be made to the drawings, wherein the same numerals are used to refer to the same parts, which will aid in an understanding of the following material.

Figure 1:
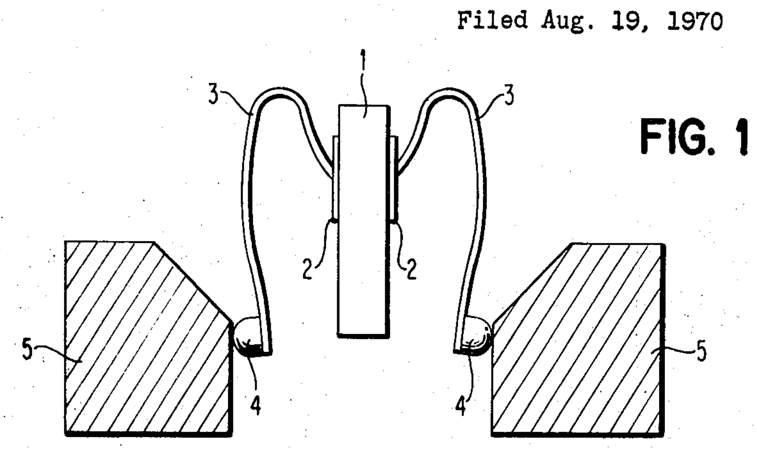
FIG. 1 is a cross-sectional schematic view of a representative spring contact clip being coated in accordance with the present invention.

Specifically, FIG. 1 shows a representative spring contact clip being coated in accordance with the present invention. In FIG. 1, there is shown an epoxy-glass laminate card support 1 having attached therto by a lead-tin solder joint 2 contact clips 3. The contact clips 3 have, on the end portion thereof, a gold button 4. Each gold button is shown contacted with, and held in place by, coating fixture 5. Upon electrophoretic deposition, the complete assembly shown in FIG. 1 is immersed in the electrophoretic bath of the present invention.

Figures 2, 3:
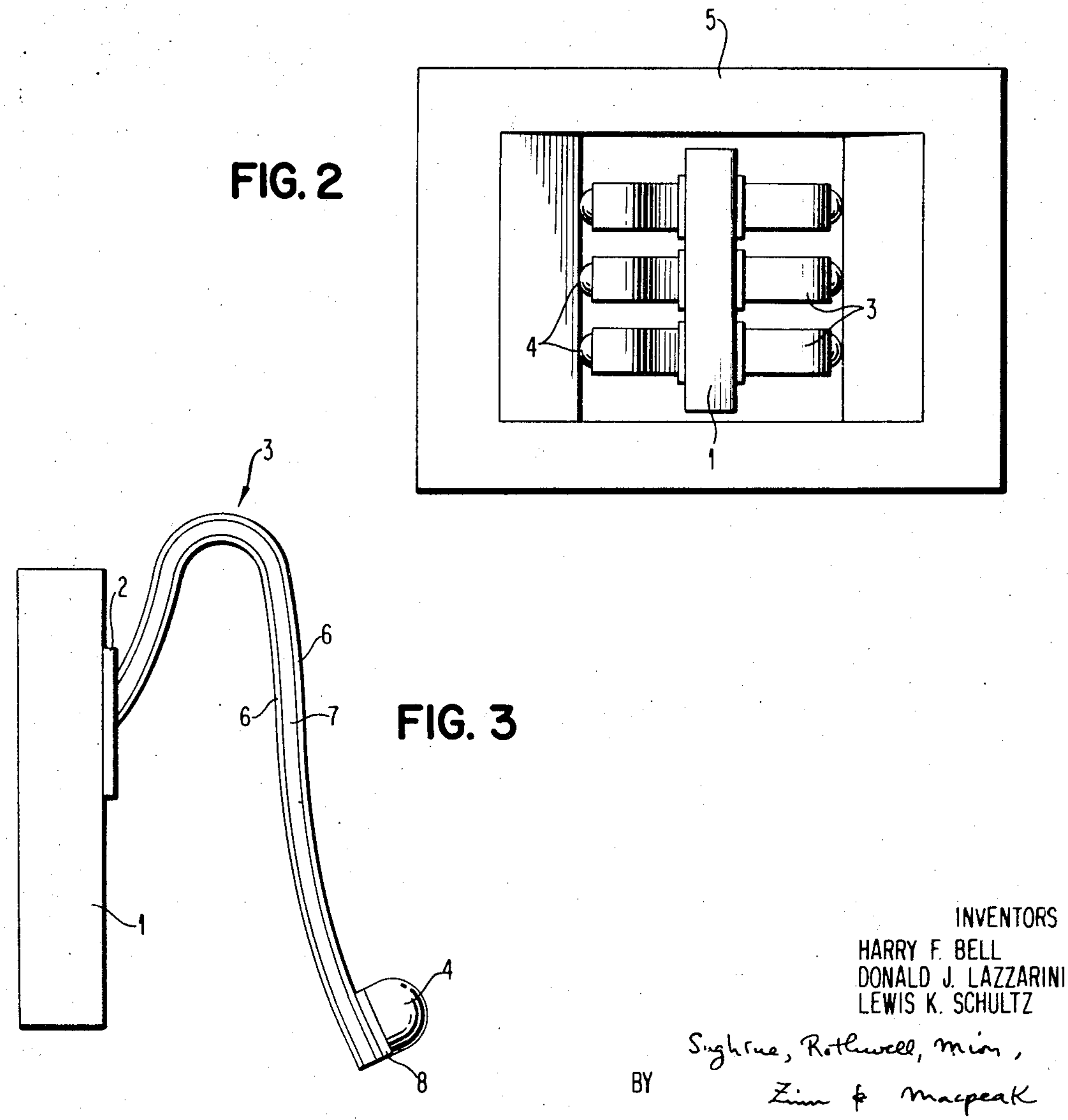
FIG. 2 is a top view of the spring contact clip of FIG. 1 being coated in accordance with the present invention and FIG. 3 is a detailed cross sectional view of the exact components forming the spring contact clip shown in FIGS. 1 and 2.

FIG. 2 is a top view of the complete assembly of FIG. 1 as immersed in an electrophoretic coating bath wherein there is shown the complete coating fixture 5 and a plurality of clips 3 carried by the card support 1.

FIG. 3 is a detailed view of one contact clip 3 as shown in FIGS. 1 and 2. Contact clip 3 is joined to a copper land (not shown) on the card 1 by lead-tin solder 2. In this figure, the contact clip 3 is actually shown as comprising a nickel-beryllium copper alloy-nickel laminate, wherein the nickel layers are illustrated by reference numeral 6 and the beryllium copper alloys by reference numeral 7. The gold contact button 4 is, in FIG. 3, actually shown joined to the nickel layer 6 by a copper-nickel pad 8.

With reference to the electrophoretic coating of the contact clips, it will be appreciated that the present invention thus offers several advantages:

(1) Electrophoretic coatings formed in accordance with the present invention will conform to and adhere to the edges of the contact clips, whereas prior art methods of applying protectives coatings do not produce conformal coatings over the clip edges.

(2) The present electrophoretic coating process provides a thin, uniform, non-porous coating, whereas prior art processes result in thick, uneven, porous coatings;

(3) The present invention provides a process which is inexpensive in comparison to the prior art processes wherein removal of polymeric material, by laser or other technique, was required; , (4) The conformal coatings of the present invention offer excellent resistance to corrosion caused by hostile environments wherein the contact clips of the present invention find particular application. For example, in process control computers corrosive chlorine and sulphur gases are often encountered. The prior art coating techniques have not imparted good corrosion-resistance to the edges of contact clips, resulting in contact failure.

In a preferred form of the present invention a polymer mixture or blend is utilized. More specifically, in a preferred embodiment, the coating comprises a polypolyvinylidene chloride/epoxy ester polymer combination. In a more preferred embodiment, benzotriazole is incorporated in the coating as a corrosion inhibitor.

It will be appreciated that single polymer systems could be used which would have the same selectively and conformality as copolymer systems; however, the two component polyvinylidine chloride/epoxy ester resinous polymer system provides an unique and valuable balance of gas barrier properties (due to the polyvinylidine chloride) and adhesive properties (due to the epoxy ester polymer).

The gas barrier or transmission rate of such a blend will be quite close to that of polyvinylidene chloride, i.e., 1.1. for oxygen and 3.3 for carbon dioxide, expressed as (std. cc.), cm.) $(10^{-12})$/(sec.) $(cm.^2)$ cm. P).

In addition to the polyvinylidene chloride described above, which most preferably has a molecular weight of 100,000 to 500,000, and a vinylidene chloride content of from 85% to 94% (the balance are polyvinyl chloride groups) other comparable materials can be utilized which will be resistant to corrosion. For instance, other polyvinylidene polymer emulsions could be used if they meet the general process requirements described.

In addition to the above properties, the electrical properties of the polyvinylidene chloride or other resin used must be considered, and the resin should most preferably illustrate a dielectric strength short time) at a ⅛" thickness greater than 300 volts/mil, a dielectric constant at $10^3$ cycles of 3.5–5.5, a dissipation factor of $10^3$ cycles of 0.4–0.075 and a volume resistivity in ohms-cm. (50% RH at 23° C.) in the range of $10^{13}$–$10^{17}$. It must be appreciated that the above factors can experience some variation with other polyvinylidene resins, but form the most preferred parameters of the polyvinylidene resins of this invention.

While many polyvinylidene chloride and epoxy ester resinous polymers can be used in this invention, the following description relates to the most preferred materials used.

In the specific example of this invention, the polyvinylidene chloride used was "Daran" X–225 polyvinylidene chloride, available from W. R. Grace & Co., Dewey & Almy Division. The "Daran" resins have a molecular weight within the range 100,000–500,000, and a vinylidene chloride content within the range 85%–94%. The softening point of this resin is about 90° C. (Fisher's John), and this resin illustrates a glass transition temperature of about 22° C.

As commercially available, the Daran resins have a total solids content (aqueous base) of 60–62%, a particle size of .13–.19 micron (avg.), a specific gravity of 1.317 to 1.347, a viscosity of 75 (cps., max.) and a heat sealability range of up to about 325° F. at 20 p.s.i. for ½ second. Their oxygen barrier capability is excellent (0.5 cc. $O_2$ through 1 mil, 100 in.², 1 atm. pressure differential, std. conditions). Typical resins in this series include Daran 220, 211, 212, etc.

In the preferred embodiment, in combination with the polyvinylidene chloride, an epoxy ester resin is utilized. The epoxy ester resins utilized in the preferred embodiment are typified by Araldite PR–805 available from Ciba Products. Other materials comparable to the epoxy ester defined above could be utilized, for instance, epoxy ester IR–1579 available from the Mobil Chemical Company and epoxy ester 3060 available from the Union Carbide Chemical Corporation. Most preferably, the epoxy ester resins have a molecular weight below about 10,000.

The epoxy ester resins or polymers are well known to the art. Typically, they are based upon the reactivity of the epoxy group,

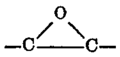

and generally contain the repeating group $$(O—C_6H_4·CMe_2·C_6H_4·O·CH_2·CH_2·CH—OH·CH_2)_n$$

where $n$ is 1 to 9. The epoxy ester resins of this invention are well known, and can be formed, for example, by the following two-step process:

Step A: The liquid epoxy resin, bisphenol A, a fatty acid, lithium naphthenate, and xylene are charged into a stirred autoclave fitted with a condenser, water trap and inert gas inlet. The reaction is blanketed with an inert gas and heated rapidly to 390° F. where an exothermic reaction occurs. A temperature rise of 90–100° F. will be noted in 5 to 10 minutes. The reaction is cooled to 470° F. and held at this temperature for 30 minutes. Additional fatty acid and triphenyl phosphite are then added to the reaction and heated to 500° F. It is necessary to distill off part of the xylene to reach 500° F. The temperature is held at 500° F. with a vigorous xylene reflux for one hour; the water is removed in the water trap. The reaction is cooled to 450° F. and held at this temperature until an acid number of 12 to 14 is obtained. The epoxy ester is then cooled to 350° F. and discharged, or cooled to 210° F. and emulsified in the same reactor.

In the above process, the following proportions are used:

| Component: | Weight (grams) |
|---|---|
| Epoxy resin | 136.38 |
| Bisphenol A | 79.62 |
| Refined tall oil acids (1% rosin) | 3.46 |
| Lithium naphthenate (1.4% in water) | 0.32 |
| Xylene | 8.77 |
| Refined tall oil acids (1% rosin) | 194.40 |
| Triphenyl phosphite | 0.82 |

Step B: The epoxy ester from Step A is then charged into a reactor fitted with a condenser, thermometer, additional funnel, and a propeller stirrer. The emulsification can also be carried out in the same reactor used for the esterification reaction. If the ester is to be transferred, it should be liquefied by heating to 250° F. Morpholine is added to the ester, heated to 210° F. and mixed for 10 minutes. Water is added with rapid stirring according to the following schedule:

7% in 60 min.
7% in 20 min.
7% in 15 min.
7% in 10 min.
7% in 10 min.
Remaining 65% in 30 min.

During the addition of the first 35% of the water, the temperature should not fall below 190° F.; no heating is necessary during the addition of the remaining water. The emulsion is stabilized by the addition of ethanol amine and ethylene glycol with stirring at room temperature.

The following proportions are used in Step B:

| Component: | Weight (grams) |
|---|---|
| Epoxy ester from Step A (97–98% N.V.) | 412.0 |
| Morpholine | 12.5 |
| Water | 424.5 |
| Total | 849.0 |

The product of Step B is an epoxy ester emulsion (50% N.V.) used in the present invention. The above data is a commercial process, and is only illustrative of the well known procedures to form epoxy ester resin emulsions.

Stabilizers such as ethanol amine, ethylene glycol, etc. can be added for long pot life, if desired. Upon dilution to the desired concentration with D.I. water, if necessary, the resin is ready for blending in this invention. Also acceptable in the present invention are epoxy modified alkyd water reducible resins.

Preferably, in the bath, from 40–60 parts of the polyvinylidene chloride polymer are utilized in combination with from 60–40 parts of the epoxy ester polymer, by weight. These proportions, of course, carry over into the deposited film. These two materials have been selected because of the fact that they provide an excellent gas barrier and adhesivity, respectively, and thus yield a blend which exhibits excellent characteristics with respect to both of the above parameters.

The above material describes the characteristics which polymers must exhibit to be operable in the present invention.

Generally, the molecular weight of such polymers is non-critical so long the resulting coating will provide the characteristics discussed above, and most specifically, will provide corrosion resistance, good adhesion and good gas barrier characteristics. Preferably, though completely non-limiting, the molecular weight of the polyvinylidene chloride polymer is within the range 100,000–500,000.

While the above system is a composite system, a single polymer can be utilized, though this will, of course, not be as preferred as the use of a multi-polymer system since, in fact, a multi-polymer system enables characteristics of two different materials to be complemented in the final coating.

In the process of this invention, thin coatings are required for microelectronic application. Such coatings should have a thickness of equal to or less than 0.007 inches. It will be appreciated this exact thickness is non-critical, and coatings greater in thickness can be formed. However, thicker coatings often encounter the faults of the prior art such as cracking, and, in fact can lead to increased cost. The thin coatings which can be achieved with the practice of the present invention form yet another advantage thereof, as the prior art could not utilize coaings of this thickness for a comparable function. Further, the use of extremely thin coatings enables close tolerances to be acheived in the final advice enabling, in fact, smaller devices to be formed since the amount of polymer which will contribute to the total thickness of individual members in the devices is lessened.

Turning now to the most preferred suspension used in the electrophoretic coating bath of this invention, the active ingredients present comprises 40–60 parts by weight of polyvinylidene chloride resin and 40–60 parts by weight of epoxy ester resin with from 0.1% to 0.5% by weight of benzotriazole. The benzotriazole serves as a corrosion inhibitor. Commercial products may be used such as Cobratec 99, available from The Sherwin-Williams Paint Company. A suspension is formed by adding the above materials, the polymers being preferably in the form of an aqueous emulsion of approximately 50% solids, by weight, in the recited proportions. The suspension is blended by agitation. Preferably, the solids content of the bath (suspension) is 25% to 70%, by weight, based on the bath composition. A most preferred range is 45 to 55% solids.

A bath containing from 0.1 to 0.5% benzotriazole will yield a final polymer film containing from .15 to 1.0% by weight (dry film basis) of benzotriazole.

It will be appreciated that in addition to water, the preferred suspending agent, organic solvents can be utilized as the suspending agent in conjunction with water. Non-water systems are primarily of lessened interest only since they are not practical in that they fail to provide as good a suspension as water.

In the example, which illustrates a preferred application of this invention, electrophoretic coating is performed on a spring contact which is a laminate of metals illustrating different oxidation potentials, for instance, a laminate of nickel-beryllium copper alloy-nickel having a gold contact button thereon, as shown in the drawings. This spring contact is soldered with a tin/lead solder to a copper land on a printed circuit board. Since the mechanism for electrophoretic deposition requires that the anode give up an ion, it is possible to use the lower formal oxidation potentials of various metals to obtain selective electrophoretic coating. Specifically, beryllium, copper and the solder utilized have a lower formal oxidation potential than the preselected electrophoretic coating voltage. Gold has a formal oxidation potential above the pre-selected electrophoretic coating voltage. While the formal oxidation potential of nickel is low, an oxide rapidly forms on its surface, which prevents electrophoretic deposition. Thus, by coating at a voltage above the formal oxidation potential of beryllium copper alloy and the solder, but below the formal oxidation potential of the gold, it is possible to selectively coat the beryllium copper alloy and the solder, while the gold and the nickel remain uncoated.

It should be noted that the voltage can be stepped to vary the thickness of the coating on the lead/tin from that on the beryllium copper alloy. If the coating voltage is held at 1.4 volts and then stepped to 2 volts ,the beryllium copper alloy will only coat during the 2 volt portion of the cycle and will thus be thinner. Several process steps can be eliminated because it is no longer necessary to clean the gold contacts, the prior are performing such cleaning by burning the polymer off with a laser.

The following are illustrative formal oxidation potentials of commonly plated metals:

| Element | Reaction | $E.^{\circ}_{ox}$ |
|---|---|---|
| Ni | $Ni \rightarrow Ni^{++} + 2e$ | +0.250 |
| Sn | $Sn \rightarrow Sn^{++} + 2e$ | +0.136 |
| Pb | $Pb \rightarrow Pb^{++} + 2e$ | +0.126 |
| Cu | $Cu \rightarrow Cu^{++} + 2e$ | −0.337 |
| $H_2O$ | $2H_2O \rightarrow O_2 + 4 + + 4e$ | −1.229 |
| Au | $Au \rightarrow Au^{+++} + 3e$ | −1.50 |

As will be obvious to one skilled in the art from the above table, at voltages below the water-oxygen potential, −1.229, the predominant mechanism for polymer deposition on soluble anodes is an ionic coagulation which results as the metal ions which have formed at the anode, and are moving toward the cathode, meet and discharge the polymer.

It is this unique utilization of the formal oxidation potentials of various metals that enables the cleaning steps used by the prior art to be eliminated.

It will be apparent that many metals in addition to those recited above can be utilized, as long as the basic concept taught is followed, that is, the utilization of the fact that electrophoretic deposition on a plurality of metals can be simultaneously carried out on selected metals of the plurality by keeping the applied process voltage below the formal oxidation potential of some of those metals, electrophoretic deposition not occuring on those metals which have a formal oxidation potential above the applied process voltage or which are inert to coating systems due to an oxide layer formation or the like.

The present inventors have found that given adequate control of the applied electrophoretic deposition voltage any metal can be selectively coated so long as the formal oxidation potential of the metal is below the applied voltage. However, for most preferred operation, the applied voltage should be about 0.1 volt greater than the formal oxidation potential of the metal which illustrates the highest formal oxidation potential which is to be coated. This value is based upon a consideration of the fact that the formal oxidation potential is a function of the metal electrodes, the concentration of oxidized metal ions in the solution, and the composition of the solution, i.e., the pH, the complexing species for the oxidized metal ions, etc. The formal oxidation potential thus varies as the composition of the solution is varied, even though the same metal/metal ion combination is used.

Further, to avoid any possible coating of metals which are not to be coated, the applied voltage is preferably maintained about 0.1 volt below the lowest formal oxidation potential of any metal which is not to be coated. However, it should be understood that with precise applied voltage control, to about ten millivolts, and sufficient time, any metal can be selectively coated so long as it has a formal oxidation potential which differs from that of another metal.

From the above discussion, it will be apparent that the present invention is thus not limited to microelectronic components, but will find application wherever it is desired to selectively deposit an electrophoretic coating on a certain preselected portion of a plurality of metal members. It will be apparent, however, that due to the close tolerances required in microelectronics, and the fact that in microelectronic assemblies a great variety of metals is used, the present invention finds particular application therein.

In light of the above discussion, the following example is provided.

EXAMPLE 1

This example relates to the electrophoretic coating of cards which are utilized in process computers, these cards basically comprising an epoxy glass laminate as shown in the drawings.

The first step is to thoroughly clean the cards utilized by immersion in any art recognized solvent. In this example ultrasonic F.I. solvent was used. This will prepare the edges of the clips for subsequent coating and insure good adhesive bonding between the electrophoretically deposited polymer blend and the clip.

In this example, the dispersion was formed from "Daran" X–255 polyvinylidene chloride resin and Araldite PR–805 epoxy ester resin. These two materials were utilized to provide an amount of the resins in the bath of 60 grams and 40 grams, respectively. Further, .1 gram of benzotriazole was added thereto. These materials were blended with water to provide a coating bath with a 50% solids total.

The average particle size was about 0.15 micron. This is of no substantial importance as long as electrophoretic deposition can proceed.

The suspension is thus actually a physical blend of the initial suspensions, and will therefore possess the properties of both suspensions with respect to particle size, viscosity, etc. The pH of the final blend was approximately 6.6, though pH is of no importance so long as the system is not coagulated.

After the suspension was formed, the cards which were to be electrophoretically coated were inserted in a coating fixture, as shown in the drawings, which was stainless steel.

The fixture must be conductive so that it can supply a voltage to the contact. The stainless steel fixture is inert because it has an oxide which does not break down at the applied voltage. Other comparable materials can be used. The purpose of utilizing an "inert" coating fixture is to prevent the fixture from being coated and, of course, to prevent the contact areas of the clips, where they are later to be joined to another component, from being electrophoretically coated. This will ensure that it will not be necessary to remove polymeric coating from the contact areas before it is possible to insert the coated device into a computer system. Accordingly, the use of an "inert" coating fixture forms a subsidiary preferred aspect of this invention.

One advantage of the utilization of a stainless steel coating fixture over the polymeric-type coating fixtures is that it can be utilized as the electrical connector between the power supply and the cards to be coated in the polymer suspension. A stainless steel fixture will not receive a coating at the depositing voltage applied since stainless steel has a high formal oxidation potential. Of course, the process voltage must be selected so as to be below the formal oxidation potential of the stainless steel fixture.

Appropriate electrical contacts are made to the coating fixture for the electrophoretic deposition to proceed, as known to the art, and thereafter the coating fixture inserted into standard state of the art electrophoretic deposition apparatus provided with appropriate voltage control means.

The coating fixture-card assembly was then immersed into the electrophoretic coating bath suspension, and the contact clips coated. Standard commercially available apparatus was used for the deposition.

In this example, a constant voltage of 2.0 volts was applied for two minutes using the above polyvinylidene chloride polymer/epoxy ester resin/benzotriazole/water suspension to yield a coating 0.00035 inch in thickness. Coating was at a bath temperature of room temperature, approximately 70° F.

After coating, the cards were removed from the fixture, rinsed in distilled water and baked to fuse the coating to the clips. In this instance, baking was at 80° C. for sixteen hours. Of course, the temperature and time of baking are non-critical as long as the resin blend is fused to the clip and is not degraded in any manner. Typically, the coating does not melt, it only fuses during deposition and the curing temperature serves to dry the coating. Two hours at 80° C. or four hours at 60° C. is sufficient. Temperatures above 100° C. would cause the entrapped water to boil and destroy the coating, and must thus be avoided.

It will be appreciated, in the above description, that if other resins are used the applied voltage and time of coating, in addition to the baking time and temperature, will vary.

Preferably, coating is at an applied voltage of about 1.7 to 2.3 volts for 95 to 145 seconds. However, on occasions, an incomplete film or too thin a film may be noted at the above time ranges, and a more preferred coating time, to insure complete, uniform coverage is 110 to 130 seconds. It is most important to observe the above time limits, and a slightly greater latitude is acceptable with the deposition voltage. Most preferably, to obtain optimum results for the polyvinylidene chloride/epoxy ester resin system, i.e., to provide a coating thickness of 0.00035 inch, coating will be conducted at an applied voltage of 2.0+0.1 volts for from 110 to 130 seconds.

Coating is usually performed at room temperature to avoid the complexity of heating or cooling equipment, with a preferred temperature range being 60 to 80° F., and a most preferred range being 65 to 75° F. However, coating can proceed, though more careful control is required so long as the bath is not too viscous or beginning to evaporate water.

The end product, after baking, thus comprised a card having soldered thereon a spring contact which is a laminate of nickel-beryllium copper alloy nickel having a gold contact button thereon. The spring contact was soldered to a circuit board. The polymer had completely adhered to the beryllium, copper and the solder used to fix the spring contact to the board, but no polymer had been coated on the gold contact button or the nickel. Of course, at the portion of the contact clip where the stainless steel fixture was attached, no coating was applied (the gold button of the contact clip is mated to the stainless steel to provide electrical contact) and appropriate contacts can readily be made thereto, after baking, without the necessity for cleaning.

Although the preferred resins operable in this invention, i.e., polyvinylidene chloride and the epoxy esters, have been heretofore described with specificity, it shall be understood that any polyvinylidene chloride and epoxy ester resin combination, including derivatives thereof, may be used in this invention as long as the blend resulting therefrom has the following characteristics: (1) the blend is capable of deposition from an electrophoretic system to yield a conformal film with good gas barrier characteristics, i.e., a film free of pin holes; (2) the blend will yield a coating which will adhere to the metal upon which deposition occurs; (3) the blend will yield a film which illustrates the required electrical properties heretofore discussed (not every electrical property need be present, and the requisite properties will vary depending upon the exact application); (4) the blend will provide a corrosion-resistant coating for electrical components utilized in hostile environments as heretofore described; and (5) the blend will provide a coating which can be fused to the substrate upon which deposition occurs without degradation at the fusion temperatures.

If the above parameters are met, the exact molecular weight of the resins used in unimportant, the amounts of said resins in the electrophoretic bath is unimportant, and the exact temperature and voltage of deposition are also relatively unimportant. The resin must, of course, be polymeric as this term is understood in the art, which will thereby insure that the coating has the requisite mechanical strength to withstand handling during device fabrication and device repair.

While the invention has been particularly shown and described with reference to preferred embodiments thereof, it will be understood by those skilled in the art that various changes in form and details may be made therein without departing from the spirit and scope of the invention.

What is claimed is:

1. A method for selectively depositing a polymeric coating onto a substrate by electrophoresis, said substrate comprising at least one exposed surface of a first metal and at least one exposed surface of a second metal comprising immersing the exposed surfaces of said first and second metals in an aqueous bath comprising an epoxy ester resin and a polyvinylidene polymer resin, applying a voltage through said first and second metals as anodes in said bath, said voltage being above the formal oxidation potential of said first metal and below the formal oxidation potential of said second metal, and continuing to apply said voltage until a coating of polymer of the desired thickness is deposited on the exposed surface of said first metal.

2. The method of claim 1 wherein said aqueous bath comprises said epoxy ester resin and a polyvinylidene chloride resin.

3. The method of claim 2 wherein said aqueous bath further comprises benzotriazole.

4. The method of claim 3 wherein the polymeric component of said bath consists essentially of from 40 to 60 parts polyvinylidene chloride and from 40 to 60 parts epoxy ester resin, by weight, and said bath further contains from 0.1 to 0.5% by weight of benzotriazole, based on the total bath weight, the total solids content of said bath being 25 to 70%, by weight, based on the total bath weight.

5. The method of claim 4 wherein said voltage which is applied through said first and said second metals is at least 0.1 volt below the formal oxidation potential of said second metal.

6. The method of claim 1 wherein said voltage which is applied through said first and said second metals is at least 0.1 volt above the formal oxidation potential of said first metal.

7. The method of claim 6 which further comprises, after a coating of the desired thickness is deposited, baking said coated substrate so as to fuse said coating to said substrate.

8. The method of claim 1 wherein said voltage is 1.7 to 2.3 volts, and said voltage is applied for 95 to 45 seconds.

9. The method of claim 8 wherein the voltage is 1.9 to 2.1 volts and the time of application is 110 to 130 seconds.

References Cited

UNITED STATES PATENTS 3,563,929 2/1971 Guldenpfening ------- 204—181

OTHER REFERENCES

Bell et al., IBM Technical Disclosure Bulletin, vol. 11, No. 8, January 1969, p. 943.

HOWARD S. WILLIAMS, Primary Examiner